Feb. 20, 1962 M. F. CHUBB ET AL 3,022,364
ELECTRIC BATTERY
Filed Nov. 15, 1957 5 Sheets-Sheet 1

INVENTORS.
Melvin F. Chubb.
BY James M. Lines.
Wood, Herron & Evans.
ATTORNEYS.

INVENTORS.
Melvin F. Chubb.
BY James M. Lines.
Wood, Herron & Evans.
ATTORNEYS.

Feb. 20, 1962  M. F. CHUBB ET AL  3,022,364
ELECTRIC BATTERY
Filed Nov. 15, 1957  5 Sheets-Sheet 3
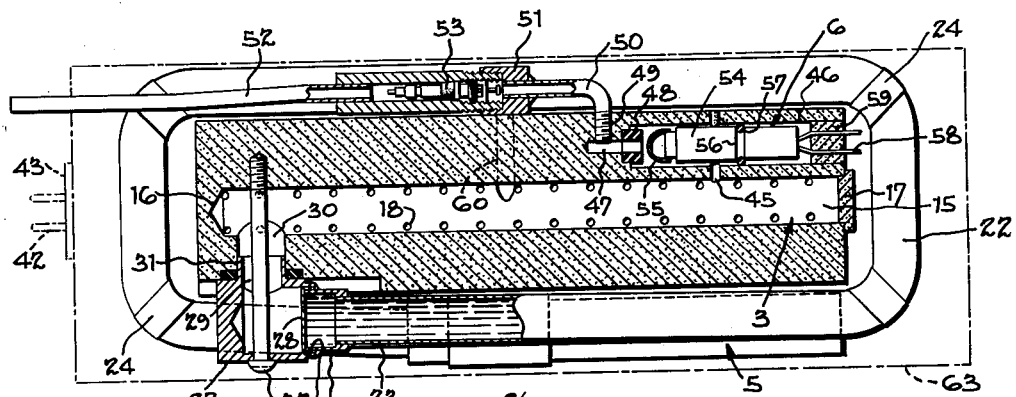
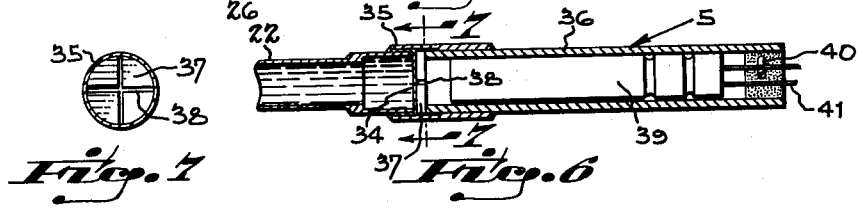
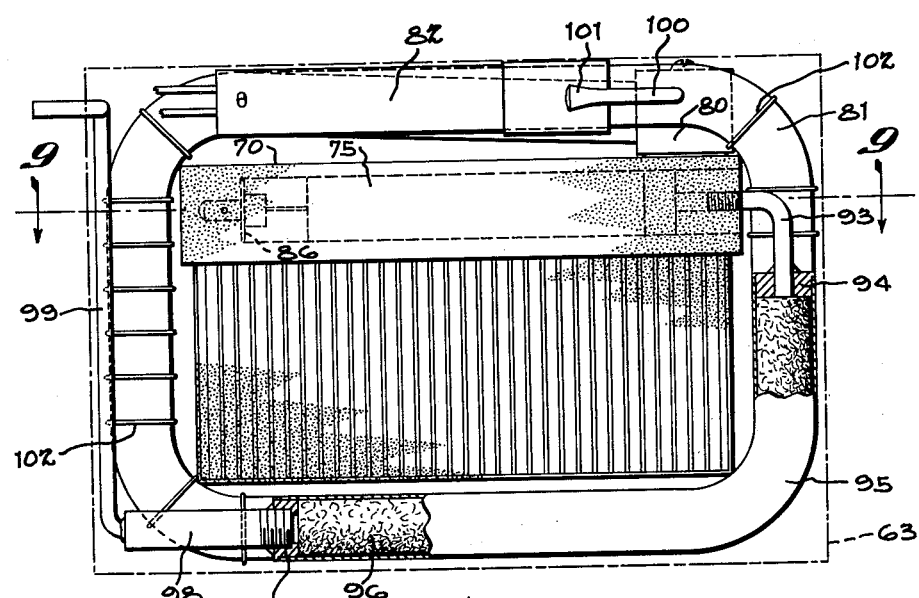
INVENTORS.
Melvin F. Chubb.
BY James M. Hines.
Wood, Herron & Evans.
ATTORNEYS.

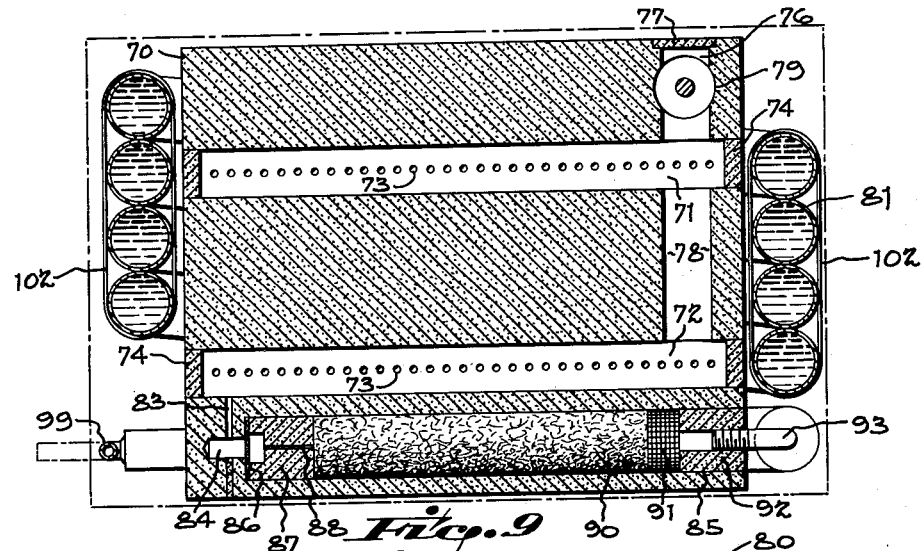
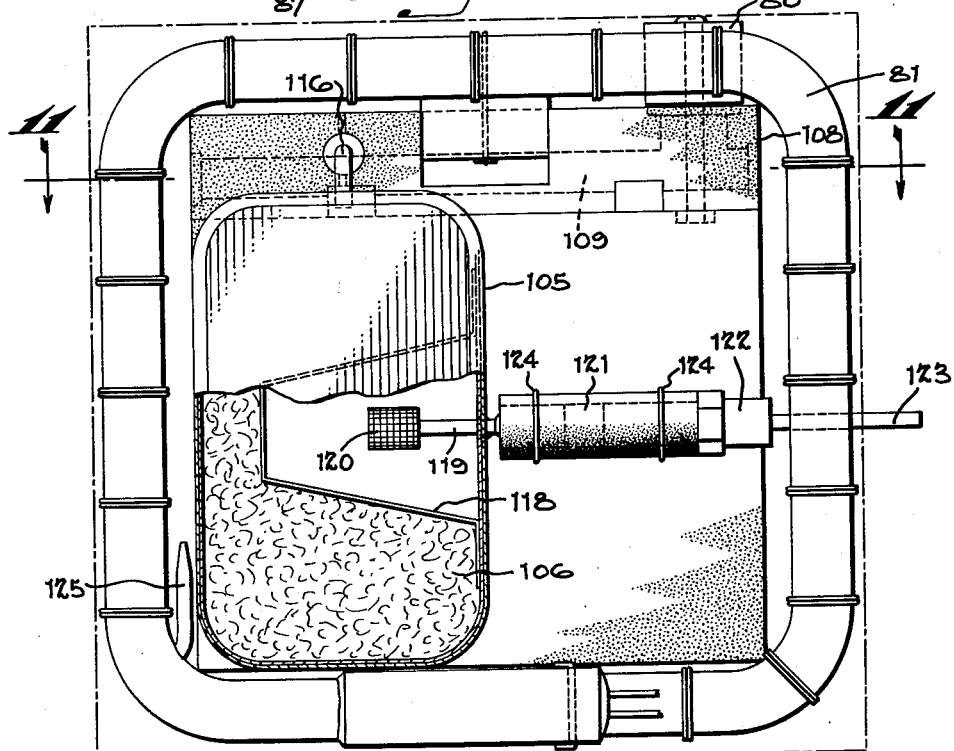

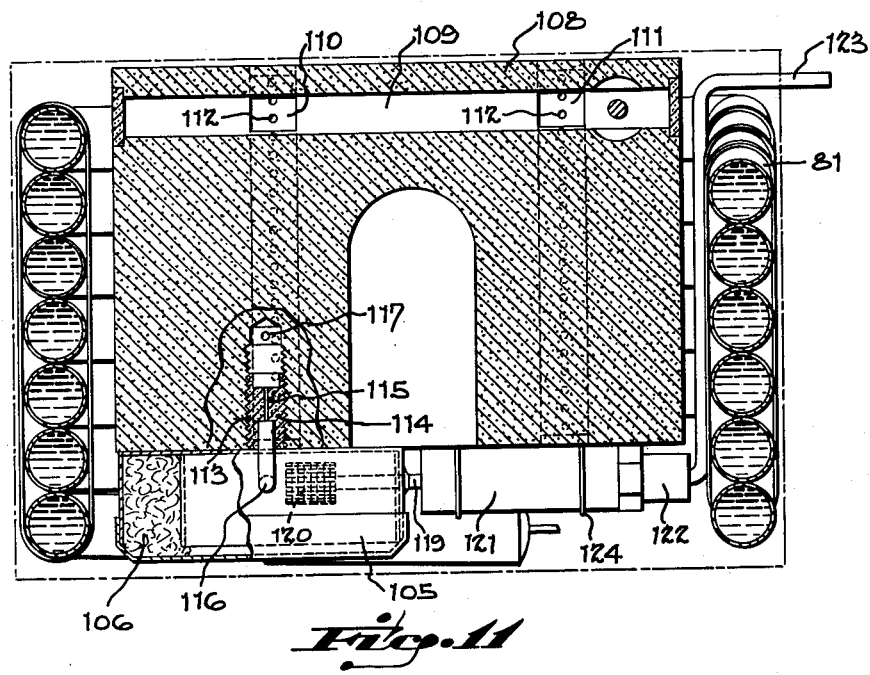

United States Patent Office 3,022,364
Patented Feb. 20, 1962

3,022,364
ELECTRIC BATTERY
Melvin F. Chubb and James M. Dines, Joplin, Mo., assignors to The Eagle-Picher Company, Cincinnati, Ohio, a corporation of Ohio
Filed Nov. 15, 1957, Ser. No. 696,654
11 Claims. (Cl. 136—90)

This invention relates to electric batteries and is directed particularly to batteries of the normally inactive type which may be activated upon admission of electrolyte to the cells thereof.

The principal objective of this invention has been to provide a battery which is normally inactive but which may be activated for use within a very short period of time, for example a fraction of a second, in response to a signal or control. Heretofore, so-called "immersion" type batteries have been made comprising positive and negative electrodes and bibulous separators associated therewith. The separators are normally dry or free of electrolyte but, upon immersion of the assembly in electrolyte such as water, the separators absorb or imbibe the liquid and thereby activate the cells. However, for many purposes, activation in this manner is impracticable or too slow. The present invention contemplates a battery comprising one or more positive electrodes, one or more negative electrodes, bibulous separators normally free of electrolyte associated with the electrodes, a self-contained supply of liquid electrolyte normally sequestered from the separators, and means for forcibly and rapidly expelling the supply of electrolyte into the separators in response to a signal.

A further objective of the present invention has been to provide a self-activating battery of this type which is small and compact in size and which will operate reliably throughout widely varying ranges of temperature and pressure conditions, whereby its activation may be effected independently of its environment.

Another objective of the invention has been to provide a self-activating electric battery which may be stored without deteriorating for long periods of time while awaiting use or activation, even though the electrolyte may be a liquid much more corrosive or chemically active than water.

Briefly, this invention contemplates an electric battery wherein liquid electrolyte is sealed within a reservoir out of contact with the separators and wherein a releasable source of gas or propulsive fluid under pressure is provided for expelling the electrolyte forcibly from the reservoir into the bibulous separators of the cells in response to signal control. In the preferred embodiment, but not necessarily, the reservoir is in the form of an elongated tube which is coiled, e.g., circumferentially, about the stack of cells whereby a compact assembly is provided. The liquid electrolyte is confined or sealed within the tube by one or more rupturable diaphragms, and the propellant source is associated with the tube, preferably externally thereof, in such manner as to rupture the one or more diaphragms and expel the electrolyte from the tube when the propellant source is released. A conduit, which may or may not be a part of the tube itself, is provided to conduct the expelled electrolyte liquid to the bibulous separators. By this arrangement sudden release of the propellant medium causes activation of the cells to occur within a very short period of time following application of the signal to the releasable propellant. The signal may be derived manually or automatically, the term "signal" being intended herein to designate mechanical or electrical means for causing the propellant to be released. For example, a preferred propellant is a mildly explosive charge capable of liberating gas upon ignition, such as a squib, which may be ignited by application of a signal voltage thereto.

The batteries of the present invention may be operated under pressure which develops in the cells in consequence of the forcible injection of electrolyte, or the cells may be vented. In either type of construction forcible introduction of electrolyte into the bibulous separators makes the batteries of the present invention independent of the ambient pressure or the pressure of the environment prevailing during cell discharge. Since electrolyte is discharged under pressure into the bibulous separators, it is preferable to vent the cell assembly, at least during storage. Otherwise, trapped air normally contained within the bibulous separators at the time of assembly might develop considerable pressure therein if the batteries were stored in an elevated temperature environment, and such back pressure would oppose the desired feed of electrolyte at the time of activation, or disruptive pressure within the cells might develop if the propellant were sufficiently powerful to force electrolyte thereto bibulous separators already containing air trapped at high pressure. However, it is also desirable to prevent discharge of electrolyte from the assembly during activation, especially if the electrolyte is of a corrosive nature and might therefore damage associated apparatus if allowed to spill. In the present invention, a vent line from the cells is provided, containing a unidirectional pressure relief valve which serves to release air that would otherwise be trapped during storage but also prevents "free breathing" of the assembly, while additional valve means activated in unison with or in consequence of the release of propellant medium is employed to close the vent line at the time of activation. The batteries of the invention also may include a liquid trap communicating with the bibulous separators to receive the excess of the electrolyte from the reservoir, if any, which they are not able to imbibe.

From the foregoing discussion of the principles upon which the invention is predicated and the following detailed description of the drawings in which preferred embodiments are shown, those skilled in the art readily will understand the various modifications to which the invention is susceptible.

In the drawings:

FIGURE 3 is an elevation similar to FIGURE 1 showing the other side of the battery;

FIGURE 6 is a longitudinal section showing the assembly of a propellant in the form of an electric squib with a reservoir of tube form;

FIGURE 7 is a cross-sectional view taken on the line 7—7 of FIGURE 6;

FIGURE 8 is a plan view showing a modified form of battery;

FIGURE 9 is a sectional view of the battery shown in FIGURE 8, as taken on the line 9—9 thereof;

FIGURE 10 is an elevation of the battery shown in FIGURE 8, illustrating particularly the liquid trap; and FIGURE 11 is a sectional view taken on the line 11—11 of FIGURE 10.

Figure 1:
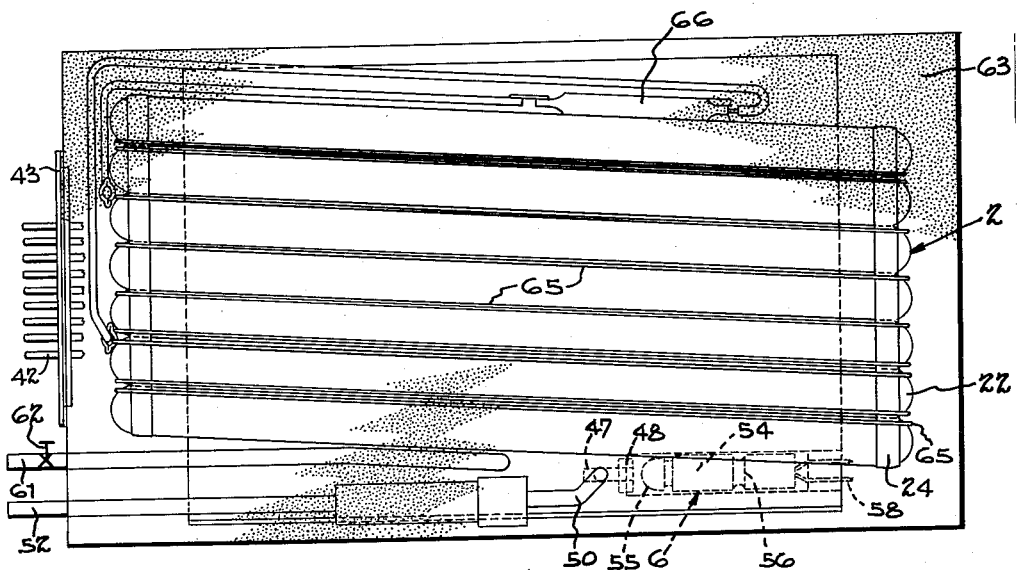
FIGURE 1 is a side elevational view showing a complete battery in accordance with the invention in which the elements are encased in assembly by a potting compound.
Figure 2:
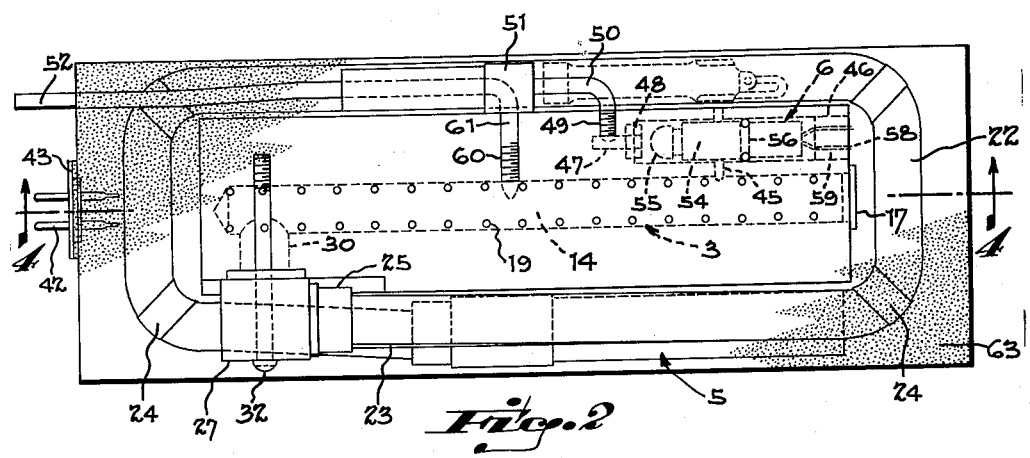
FIGURE 2 is a top plan view of the battery shown in FIGURE 1.
Figure 5:
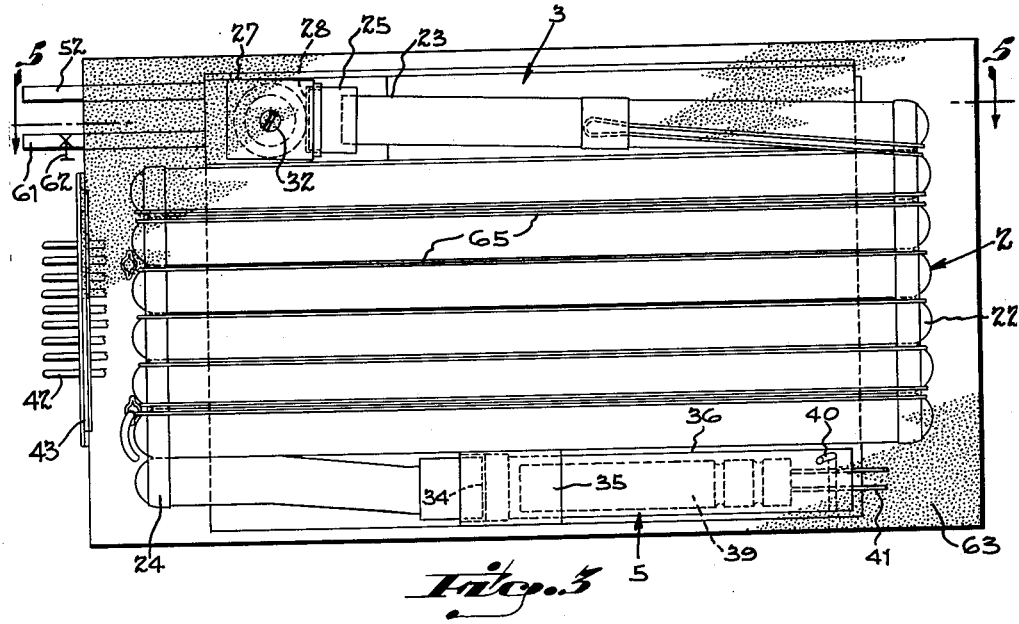
FIGURE 5 is a cross-sectional plan view taken on the line 5—5 of FIGURE 3.
Figure 4:
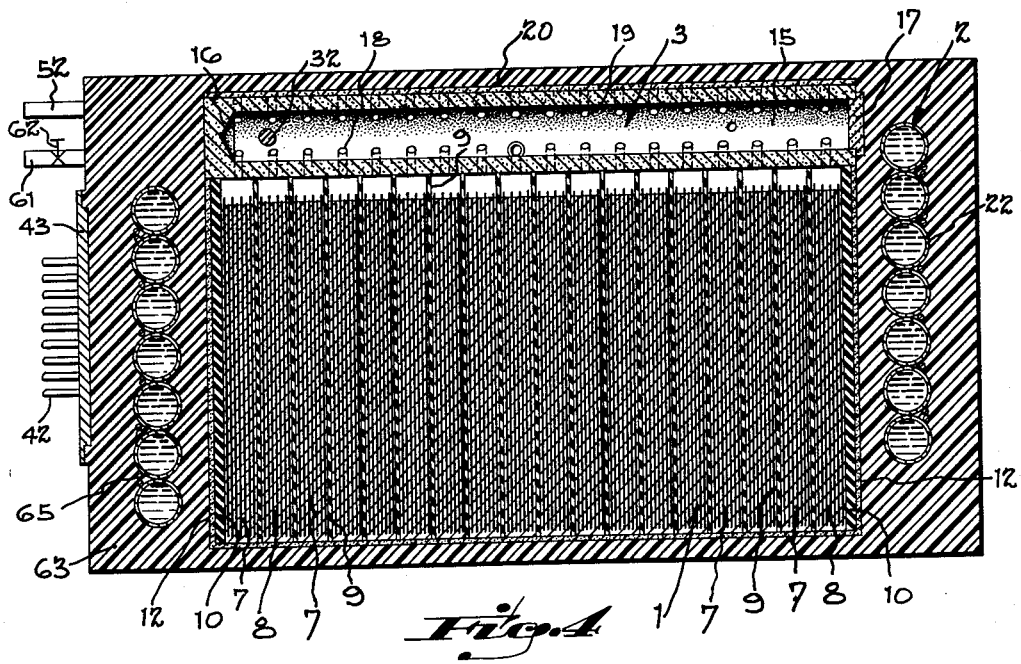
FIGURE 4 is a cross-sectional view taken on the line 4—4 of FIGURE 2.

The battery illustrated in FIGURES 1 through 5 of the drawings comprises one or more cells indicated generally at 1, an electrolyte reservoir indicated generally at 2, a manifold 3 for conducting electrolyte expelled from the reservoir to bibulous separators in the cells, a propellant source indicated generally at 5 for expelling electrolyte from the reservoir to the manifold, and a cell vent system indicated generally at 6 (FIGURE 2).

The battery shown is a cell of the multiplate type comprising interleaved positive electrodes 7, negative electrodes 8, and bibulous separators 9 which are disposed in relation to the positive and negative electrodes to activate the cell when liquid electrolyte is present in the separator. Those skilled in the art will understand that various electromotive couples and other types of assembly such as piled or stack cells may be used to constitute the battery proper. By way of illustration, the negative electrodes in the multiplate assembly shown may be made of sheet zinc and the positive electrodes of silver oxide (for example, silver monoxide), while the electrolyte employed to activate this type of couple may be an aqueous solution of caustic soda or caustic potash. As will also be understood, the electrodes may be electrically interconnected in parallel or series to provide the voltage which is desired for "A" battery, "B" battery, or other service.

In the construction shown, the positive and negative electrodes are spaced part, and the bibulous separators 9 are placed intermediate the positive and negative electrodes. The bibulous separators may be in the form of pads of cotton cellulose, acetate fibers, or other suitable fibrous absorbent matreial. Plates 10, 10 of suitable plastic material, e.g., Lucite, are placed at the opposite ends of the stack of cells, and the cell assembly is then encased within a wrapper 12 which may be in the form of an adhesive tape or plastisol membrane covering the sides, ends, and bottom of the pile. As will be noted in FIGURE 4, the upper edges of the separators project above the electrodes to prevent short circuiting.

The electrolyte distribution manifold surmounts the cells, preferably residing upon the upper edges of the separators thereof and, as shown, is in the form of a block 14 fabricated of electrically non-conductive plastic such as Lucite drilled longitudinally so as to provide a bore 15 extending substantially through the length of the cells but terminating short of the end of the block, as at 16. The opposite end of bore 15 is capped by a turned plug 17 which is cemented in place. To admit electrolyte from the distribution passage 15 to the bibulous separators 9, discharge ports 18 are provided. These may be in the form of holes extending transversely through the manifold block respectively in alignment with the plates and separators in the stack of cells, there preferably being at least two ports 18 for each interseparator space in order to insure distribution of electrolyte. Or, if desired, the ports may communicate directly with the separators. In assembly, it is desirable to be certain that none of the ports 18 is plugged inadvertently by drill chips or the like; and in the preferred construction, the drill holes constituting the ports 18 extend all the way through the manifold block, thereby providing cleanout holes 19 at the top of the block aligned with the ports 18, through which, at the time of assembly, a wire may be poked in order to clear the ports 18 of any obstruction they might have. The ports 19 subsequently are closed by a plate 20 of Lucite cemented across the upper row of holes.

The liquid electrolyte for activating the battery is contained within a reservoir 2 which, in the preferred construction, is a metal tube 22 wound convolutely around the pile of cells. This tube may be made of any metal which is chemically inert to the electrolyte and is capable of withstanding the internal pressure developed upon release of the propellant. For example, pure copper tubing has been found capable of withstanding the corrosive nature of aqueous caustic potash as employed for activation of a zinc-silver oxide couple and also capable of withstanding the pressure generated upon ignition of an electric squib as the propellant medium. As shown in the drawings, the copper tube 22, starting at the bottom as shown in FIGURE 3, proceeds at the left and upwardly around the stack of cells, each convolution of the tube residing closely adjacent the preceding convolution, the tube terminating at the top of the stack along the side of the manifold block 3, as at 23. For convenience in fabrication, a continuous length of copper tubing may be preformed by winding it around a suitable mandrel, and the convolutions of the coil provided in this way may be taped together by adhesive tape 24.

The upper or discharge end of the reservoir 22 terminates in a collar 25 (FIGURE 3) which is received within a bore 26 of an adaptor block 27 also made of copper or brass. However, intermediate the end of the collar 25 and the adapter block 27, an annularly flanged, rupturable diaphragm 28 is installed across the end of the collar so as to close off the end of the reservoir tube, and all of these parts are soldered into liquid and pressure-tight connection with one another as by means of silver solder.

Beyond the diaphragm 28, the bore 26 within the adapter block 27 communicates with a cross bore 29 which, in turn, communicates with an opening 30 drilled through the manifold block 14 to intersect the longitudinal bore 15 thereof. To hold the adapter block in pressure-tight connection with the manifold block, the adapter block is counter-turned as at 31 for mating reception within an annular seat in the manifold block, and a bolt 32 having its head seated against the outside of the adapter block extends through the bores 29 and 30 into threaded engagement with the manifold block at a point beyond the longitudinal bore 15 therein. Cement may be applied at the shoulder 31 to complete the seal.

The opposite end of reservoir tube 22 (FIGURE 6) is capped by an annularly flanged, rupturable diaphragm 34 which seals the liquid electrolyte within the tube. This construction may be similar to or the same as that in which the diaphragm 28 is installed at the other end. For example, as shown, the end of the tube 22 and the skirt of the diaphragm surrounding it are received within the end of a coupler 35 having a propellant housing 36 received within its other end. A disc 37 of suitable material such as brass is cross slotted and drilled as at 38 and is installed within the coupling tube 35 between the diaphragm 34 and the end of the propellant housing 36. This allows gas pressure from the squib to be exerted against diaphragm 34 but prevents any solid material of appreciable size from the squib to enter the reservoir. All of the metal parts are soldered together. The housing 36 may be of tubular form, arranged as a longitudinal extension of tube 22.

An electrically ignitable squib 39 is placed within the housing 36 to seal the tube. To hold the squib firmly within the housing against rearward escape at the time of ignition, the shank portion of the propellant tube is cross drilled to receive a pin 40, and a suitable plugging cement is applied behind the squib element around the electric conductors 41 which lead from the squib. The pin 40 acts as a reinforcement to sustain the backward thrust of the squib upon ignition thereof, and the plugging cement prevents rearward escape of the gases liberated from the squib.

To avoid confusion in the drawings, the lead conductors 41 leading to the squib as well as the other wires leading from the battery cell or cells have not been shown in detail, but it will be understood that they may be connected to terminals 42 of a terminal plate 43 located at the outside of the assembly as subsequently described, the terminals being arranged in coded formation for connection to a multi-conductor plug.

Squibs of the type similar to those used in conjunction with commercial explosives are satisfactory to provide the pressure propellant medium in the batteries of the present invention, although the squibs used for the present purpose preferably are constructed to burn at a somewhat slower rate so as to be less violent in discharge. Such squibs contain electric ignitors, by application of a voltage to which the squibs are caused to discharge. However, in place of using conventional ignitors, so-called electric matches which are commonly available may be employed, and any medium capable of releasing a gas upon ignition may be used in place of a squib. Various other means capable of releasably furnishing gas under pressure, such as capsules containing compressed nitrogen or carbon dioxide and releasable or rupturable mechanically or electrically, may also be employed in alternative constructions. In the typical construction shown, the squib, once ignited, burns over a period of several tenths of a second to produce gas under sufficient pressure and in sufficient quantity to burst the rupturable diaphragms of the reservoir tube and blow the electrolyte out of the tube.

At a point on the manifold bore 15 spaced longitudinally from the inlet aperture 30 thereof, the manifold contains a gas vent aperture 45. This communicates with a bore 46 which may be drilled into the manifold block in spaced parallel relation to the manifold bore 15. Passageway 46 terminates in a small bore 47, but a seat member 48 is provided at the juncture of the bores 46 and 47. A hole 49 bored through the manifold block into the bore 47 is threaded to receive a vent pipe 50 having its opposite end connected to a pressure relief valve housing 51, while a vent pipe 52 extends from the other side of the housing 51 to the exterior of the assembly, i.e., to atmosphere. A valve 53 of the unidirectional type such as an ordinary spring biased tire valve is received in housing 51 so as to open if the pressure in the cell assembly, as applied to the valve through the line 50, exceeds a predetermined value and so as to close under its own spring pressure as soon as that pressure is suitably relieved. Thus, since the pressure relief valve 53 opens only in response to an undesirable internal pressure, air or gas can escape from the battery but cannot enter the battery through vent pipe 52. The valve 53, therefore, relieves excess internal pressure but does not permit the battery to breathe through the vent pipe 52, which might cause deterioration during storage if the battery were stored under varying temperature conditions.

A motor 54 is installed in the bore 46 to close the vent passages when the battery is activated, thereby preventing discharge of electrolyte through the vent line 52. The motor 54 may be in the form of a conventional small squib or dimple motor having a plug 55 at its head end which is normally spaced from the seat 48 but which is engageable with the seat upon ignition of the squib. To hold the squib in such position that its plug 55 is normally spaced from the seat 48, the body of the squib is provided with a circumferential groove 56, and bores spaced apart a distance corresponding to the groove diameter are provided in the manifold block respectively to receive pins 57 which enter the circumferential groove 56 and thereby hold the squib against longitudinal movement. Control wires 58 pass through the bores in a plug 59 which is received within the bore 46, all of these parts being cemented together in gas-tight relation. Like the lead wires 41 of the main propellant, the lead wires 58 of vent control squib 6 pass into connection with selected terminals on plate 42.

Preferably, squib 54 is actuated to close vent line 50 at the same time that the main propellant charge is released thereby to prevent escape of any liquid electrolyte through the vent line 52. However, it is also to be understood that where escape of liquid electrolyte through the vent line can be tolerated, or where the vent line is led to a point where liquid can be discharged from it to a point where associated apparatus will not be damaged, then the valve 54 may be omitted entirely. Also, for test purposes, or for manual or controlled venting of the battery after activation, a supplemental vent may be provided as shown. For this purpose a cross hole 60 in the block 14 intersects the manifold bore 15 thereof, and it is threaded to receive vent conduit 61 which may be equipped with a control valve indicated diagrammatically at 62.

Upon completion of the assembly as described, a potting compound 63 such as epoxy resin either of the solid or foam type is poured around all of the parts to hold the elements of the assembly as well as the electric conductors firmly in place against movement. The potting preferably is conducted in a mold or metal case (not shown). Terminal plate 42 may be molded into the assembly in this operation.

Batteries of the type to which the present invention is addressed are required for service under widely varying temperature conditions, and, at low environmental temperatures, the liquid electrolyte within the reservoir 22 may freeze or become cooled below temperatures favorable to prompt activation. In accordance with the present invention, satisfactory operation under very low temperatures is obtained in a simple manner by utilization of the good heat conducting properties of the reservoir 22. For this purpose, electric heating resistance heating wire 65, electrically insulated, is laid along the reservoir tube in the nip spaces between adjacent convolutions thereof. The resistance wires are connected to suitable terminals on the terminal plate 43 for energization from an external source. The heat which is generated by the wires is imparted efficiently to the electrolyte within the reservoir tube through the heat conducting properties of the copper against which the wires reside, the heat conducting contact being promoted by the embrace of the potting compound 63. This electrical heating system may include a thermostatic switch 66 (FIGURE 1) placed adjacent one of the convolutions of the reservoir tube 22. By application of electrical energy to the wires through the terminals at the exterior, the battery readily is maintained at proper operating temperature even though the environmental temperature may be far below the freezing point of the electrolyte solution. Following activation, energy from the battery itself may be used to sustain desired operating temperature.

The diaphragms 28 and 34 positively seal the liquid electrolyte within the electrolyte reservoir 22 against escape throughout the period while the battery is in storage or while it is awaiting use. However, the diaphragms are selected to rupture under the gas pressure which is generated or released in the propellant housing 36 upon ignition of the squib or release of gas from the source therein. For example, satisfactory results have been obtained with diaphragms made of sheet copper approximately ⅜" in diameter, .001 to .005 inch thick, in such case the bursting pressure being approximately 200 p.s.i. Thus, upon application of a control voltage through the leads 41 to the propellant 39, the pressure of the gas liberated thereby exerts a force against diaphragm 34 sufficient to burst the same. The force now exerted on the electrolyte is transmitted by the liquid and thereby exerted against the diaphragm 28 to burst it also. The pressure gas provided by the squib now pushes against the column of liquid in the reservoir tube causing it to be expelled through the adapter block 27 into the manifold 15 and out through the ports 18 thereof into the bibulous separators 9 of the cells. Electrolyte emerges at substantial velocity and under considerable pressure from the ports 18 and thereby is applied to the bibulous separators along the upper edges thereof.

Whatever air is contained within the bibulous separators, and no doubt there is some, appears initially to be compressed by the electrolyte admitted to the separators but is soon dissipated either by the capillarity of the fibrous material constituting the bibulous separators or by absorption into the liquid electrolyte at the prevailing pressure. At any rate, in the application of electrolyte in the manner described, entrapment of air residing in the separators does not occur to any degree significantly impairing prompt activation of the cells. The battery becomes activated in a fraction of a second.

The battery shown in FIGURES 8 and 9 is of the same general construction as the one previously described except that this construction operates at ambient pressure, and a liquid trap is provided to catch excess electrolyte. In this construction, the manifold block 70, which may be of plastic as previously described, surmounts the cells and contains milled manifold slots 71 and 72 which reside in spaced, parallel relationship to one another across the top of the cells. The manifold slots contain ports 73 communicating respectively with the bibulous separators of the cells. The ends of the manifold slots are plugged by end pieces 74, 74, and a cover plate 75 encloses the upper edges of the milled slots to complete enclosure of the manifold passageways, all of these parts being held in place by cement. A cross bore 76 which is plugged as at 77 provides a passageway 78 interconnecting the manifold passages 71 and 72.

As shown in FIGURE 9, the upper surface of the manifold block is counterbored as at 79 to receive the adapter block 80 which is connected to the reservoir tubing 81 in the same manner as in the battery previously described. Similarly, the opposite end of the reservoir tube is equipped with a similar propellant assembly indicated generally at 82 (FIGURE 8), and each end of the reservoir tube is sealed by a rupturable diaphragm to confine the electrolyte therein.

For venting and entrapment of liquid overflow, manifold 72, at the end spaced from the cross-connecting passage 78, is provided with a port 83 which intersects a small longitudinal bore 84 in the manifold block. This, in turn, is in axial alignment with a bore 85 extending parallel to the manifold 72. At the juncture of bores 84 and 85, a porous filter membrane 86 is installed, beyond which is a plug 87 containing a metering orifice 88. Beyond the plug 87, the bore 85 is filled with a porous, fibrous body 90, of acetate fibers, thread or the like for example, and a filtering coil in the form of a convolutely wound wire screen 91 is placed at the end of the porous body 90. The bore 85 is closed by a plug member 92 which is cemented in place, and the plug has a threaded throughbore to which a short copper elbow 93 is attached.

As best seen in FIGURE 8, the elbow 93 extends into an end plug 94 of a liquid trap tube 95 which is also filled with porous, liquid-absorbent substance, such as absorbent cotton, 96. For purposes of compaction, tube 95 is arranged in parallel with convolutions of the reservoir coil 81 and extends along one side of the battery where it terminates in a plug 97 to which a valve housing 98 is attached. The valve housing contains a unidirectional pressure relief valve which may be of the type previously described in FIGURE 5. A vent line 99 extends from the valve housing 98 across the end of the battery and extends beyond the potting compound, indicated by the dot-dash line, into communication with the atmosphere.

In this construction, release of the propellant contained in the element 82 burst the rupturable diaphragms at the ends of the reservoir tube 81, and electrolyte flows therefrom into adapter block 80, thence through the passage 78 into the manifolds 71 and 72, from which it passes through ports 73 to the separators of the cells at spaced points along their upper edges. The battery is now activated.

The collective area of the ports 73 is much greater than the area of the metering orifice 88 in the vent line, and the porous members in bore 86 and the liquid trap tube 95, while allowing gas flow, serve to impede the flow. For these reasons, the electrolyte passes into the bibulous separators. Meanwhile, air in the system ahead of the advancing column of electrolyte is expelled through the port 84, the metering orifice 88, thence through the porous fillers 90 and 96, past the pressure relief valve contained in the housing 98, and out through the vent line 99.

Any excess of electrolyte contained in the distribution system but unable to pass through ports 73 is free to pass through the outlet orifice 84, thence past the filter membrane 87 and the orifice 88 into the filler 90, but again it is to be noted that the impedance to flow in the vent system insures that the needs of the bibulous separators for activation will first be served. The filtering membrane 87 meanwhile prevents plugging of the metering orifice by loose material which might be entrained in the liquid stream.

Some absorption of excess electrolyte occurs in the body of the filter 90, but additional capacity for entrapping liquid is provided by the absorbent material in the liquid trap tube 95 into which excess liquid passes from the elbow 93. Thus, excess liquid is captured by absorption while gas is vented. Momentarily following release of the propellant, the pressure in the system is high, but the pressure subsides as valve 98 opens, and the battery, once activated, operates substantially at atmospheric pressure.

In connection with FIGURE 8, it will be noted that the reservoir tube 81 at a point just beyond the discharge end of the propellant tube is equipped with a small tube 100 having an end 101 which is flattened as shown. This tube is used to facilitate filling of electrolyte into a prefabricated reservoir tube assembly after the propellant tube and rupturable diaphragm have been soldered to its one end and its other end and associated diaphragm has been soldered to the adapter block 80. To fill the reservoir with electrolyte, it is first evacuated by means of a vacuum pump through the open end of filler tube 100. After evacuation, and by means of a conventional filling valve, liquid is admitted to the reservoir through the filler tube 100 until the reservoir is filled, after which the end of the filler tube 100 is pinched off and soldered closed.

A modified form of heating system is also shown in FIGURES 8 and 9. In this case electric resistance heating wires 102 are wound transversely around the coils of the reservoir tube instead of longitudinally along the coils as previously described. In this arrangement the heating wires serve mechanically to hold the coils against one another while at the same time imparting heat thereto.

In the battery shown in FIGURES 10 and 11, a further embodiment of a liquid trap is disclosed in the form of a sealed metal can 105 which is filled with absorbent packing 106 such as absorbent cotton. The can is placed along the side of the stack of cells as shown in FIGURE 11. In this construction the manifold block 108 is provided with a main distribution passage 109 which feeds to spaced passages 110, 111 respectively having ports 112 for admitting electrolyte to the bibulous separators of the cells with which they are aligned. The liquid reservoir, equipped with a propellant as previously described, terminates in an adapter block which is mounted on the manifold block at the seat 111. However, for venting in this instance the manifold block is bored and threaded as at 113 (for example, at a level above manifold passage 110, FIGURE 11) to receive a plug 114 having a metering orifice 115 therein. An elbow 116 communicating with the liquid trap can 105 is connected to the plug 114, while a hole 117 intersecting the bore 113 and the manifold passage 110 provides communication therebetween.

Inside the can 105, a barrier wall 118 is mounted. This extends from the top to the bottom wall of the can, but in spaced relationship thereto, the purpose of the barrier being to allow gas to pass but to restrain the absorbent packing against dislodgement as liquid flows into the can. A vent line 119 passes through the wall of the can in sealed relationship thereto, and within the barrier space the vent line carries a filtering screen 120 which will catch any particles of lint that might have escaped past the barrier. At the outside of the can, the vent line 119 is coupled to a rubber tube 121, the opposite end of which is coupled to the exterior of a valve housing 122 having a unidirectional pressure relief valve installed therein which is normally closed but which is capable of opening under pressure from the inside of the battery as previously described. A vent line 123 extends beyond the valve housing to atmosphere. The rubber tubing 121 is coupled to the vent line 119 and the valve housing by bands 124; this flexibility allows the parts to be adjusted to predetermined relationship to one another prior to application of the potting compound. In this construction, the electrolyte filler tube is shown at 125.

In the operation of the battery shown in FIGURES 10 and 11, the release of propellant causes the rupturable diaphragms at the ends of the electrolyte reservoir to be burst, causing electrolyte to flow through the adapter block 80 into the distribution passage 109, thence into manifolds 110 and 111 whence it enters the bibulous separators in the cells via the ports 112. Through port 117 gas and excess liquid which the separators are unable to absorb pass at impeded rate through the metering orifice 113, then through the conduit 116 into the liquid trap 105 where the liquid is absorbed by the filler 106 therein. Gas passes beyond the barrier wall 118 through the screen 120 into the vent line 119 and, if the pressure is high enough, the unidirectional valve in the housing 122 is unseated to relieve the pressure. Thus, the liquid is held against escape while the gas pressure is relieved.

Where batteries of large electrical capacity are required, there may be a considerable amount of air normally contained in the bibulous separators, through which substantial internal pressures could develop in the absence of pressure relief provisions. A substantial amount of gassing of the cells (depending on the type of couple and the electrolyte selected for use) might occur subsequent to activation, through which disruptive pressures might arise if no provision for relief were made. The unidirectional valves in the various vent systems which have been described serve both purposes, while the liquid traps provided as shown in FIGURES 8–11 retain excess electrolyte against escape where it might otherwise be objectionable.

While the tubular form of electrolyte reservoir has been disclosed principally because of the advantages which it provides as to liquid capacity, strength, and compactability, it will readily be understood that the reservoir may be of conventional can construction for delivering liquid in response to the application of an internal pressure. Thus, an important advantage of the present invention resides in the prompt activation of a battery by forcible injection into the cell separators of electrolyte which is completely sequestered therefrom until activation is required.

Having described our invention, we claim:

1. In an electric battery of the type wherein positive and negative electrodes are associated with bibulous separators which are normally free of electrolyte but which are physically associated with the electrodes to cause the battery to become activated upon introduction of liquid electrolyte into the bibulous separators, means for forcibly introducing liquid electrolyte into the bibulous separators to effect rapid activation of the battery, said means comprising a normally sealed reservoir in the form of an elongated pipe filled with liquid electrolyte wrapped around said battery, conduit means leading from one end of said pipe to said bibulous separators and including at least one rupturable diaphragm normally obstructing escape of fluid electrolyte from said pipe into said conduit means, and releasable means associated with the other end of said pipe for introducing gas directly into said pipe against the electrolyte therein at a pressure sufficient to burst said rupturable diaphragm and in pressure and volume sufficient to expel the electrolyte from said pipe to said bibulous separators through said conduit means.

2. An electric battery comprising a plurality of cells each including a positive electrode, a negative electrode, and a bibulous separator, physically associated with said electrodes to activate said cells upon application of electrolyte to said separator, and means for applying electrolyte to said bibulous separators comprising a reservoir in the form of an elongated pipe wrapped around said plurality of cells and containing liquid electrolyte, conduit means extending from said one end of said pipe to said cells for conducting electrolyte to said separators, said electrolyte being confined in said pipe by means including a rupturable diaphragm positioned between the said one end of said pipe and said conduit means, and ignitable means for producing combustion gas upon ignition thereof associated with the other end of said pipe to project the same into said pipe, said ignitable means being constructed and arranged to furnish such combustion gas under pressure sufficient to burst said rupturable diaphragm means at the other end of said pipe and under sufficient pressure and volume to expel the electrolyte from said pipe into said conduit means.

3. The electric battery of claim 1 wherein the said releasable means is an electrically dischargeable gas-generating squib.

4. An electric battery comprising at least one cell having positive and negative electrode means and bibulous separator means intermediate the said electrode means, an elongated tubular member wrapped circumferentially around said cell so as to embrace the same, said tubular member having endwise closures at least one of which is a rupturable diaphragm, said tubular member containing electrolyte for activating said cell upon admission thereof to said bibulous separator, conduit means at one end of said pipe for conducting electrolyte from said tubular member to said cell upon rupture of said diaphragm, and an electrically ignitable squib associated with the other end of said pipe for introducing gas resulting from the combustion thereof, upon ignition of said squib, to the interior of said tubular member under pressure sufficient to rupture the said diaphragm and in volume sufficient to expel electrolyte from said tubular member and the said cell.

5. The electric battery of claim 1 in which all of the elements including said pipe wrapped around said cells are encased in assembly in a potting compound.

6. The electric battery of claim 1 including vent means effective at least prior to release of said propellant medium for releasing gas from said cells while excluding the entrance thereto of air from the atmosphere.

7. The battery of claim 1 wherein electric resistance wire is associated with the exterior of said pipe for heating the same to raise the temperature of the electrolyte therein to a temperature greater than the ambient temperature 8. The battery of claim 1 wherein one of the electrodes of each cell is zinc, the other electrode of each cell is silver oxide, and the electrolyte in said reservoir is an aqueous solution of an alkaline hydroxide.

9. The battery of claim 2 in which a liquid trap is associated with said conduit to accept liquid electrolyte expelled from said reservoir in excess of the amount the said separators are capable of absorbing.

10. The battery of claim 2 including a vent conduit communicating with said cells to relieve gas pressure therefrom.

11. The battery of claim 2 including a vent conduit communicating with said cells and having a normally closed pressure relief valve therein, and means operable substantially in unison with the release of pressure from said releasable pressure exerting means for rendering said vent conduit ineffective to vent said cells.

(References on following page)

References Cited in the file of this patent

UNITED STATES PATENTS

| | | |
|---|---|---|
| 750,250 | Bryan | Jan. 26, 1904 |
| 2,282,923 | Ambruster | May 12, 1942 |
| 2,564,495 | Mullen | Aug. 14, 1951 |
| 2,806,895 | Dines | Sept. 17, 1957 |
| 2,824,164 | Bauman | Feb. 18, 1958 |

FOREIGN PATENTS

| | | |
|---|---|---|
| 454,393 | Canada | Feb. 1, 1949 |
| 1,126,430 | France | July 30, 1956 |
| 693,191 | Great Britain | June 24, 1953 |